United States Patent [19]
Werbowsky et al.

[11] Patent Number: 5,573,180
[45] Date of Patent: Nov. 12, 1996

[54] PROTECTIVE THERMOSTAT

[75] Inventors: Laurie L. Werbowsky, Jamesville, N.Y.; William F. Van Ostrand, Indianapolis, Ind.; Peter G. Pierret, Fayetteville, N.Y.; Hall Virgil, Jr., Brownsburg, Ind.

[73] Assignee: Carrier Corporation, Syracuse, N.Y.

[21] Appl. No.: 510,682

[22] Filed: Aug. 3, 1995

[51] Int. Cl.$^6$ .............................. F25B 29/00; G05D 23/00
[52] U.S. Cl. ..................... 236/46 R; 165/257; 236/91 R
[58] Field of Search .................... 236/46 R, 91 R, 236/91 D; 165/12, 28

[56] References Cited

U.S. PATENT DOCUMENTS 5,293,755  3/1944  Thomas .................................. 236/91 R

FOREIGN PATENT DOCUMENTS 1189709  7/1989  Japan ........................................ 236/94

*Primary Examiner*—William E. Wayner

[57] ABSTRACT

A thermostat monitors the indoor air temperature indicated by the thermostat's indoor air temperature sensor. The monitored indoor air temperature must be within a predefined range of acceptable temperatures to be considered valid. In the event the monitored temperature is outside this predefined range, the thermostat proceeds to read the outdoor air temperature and activate a heating system if the outdoor air temperature reading is below a predefined level.

14 Claims, 3 Drawing Sheets

PROTECTIVE THERMOSTAT

BACKGROUND OF THE INVENTION

This invention relates to the thermostatic control of a heating system. In particular, this invention relates to the thermostatic control of a heating system when the temperature sensing function of the thermostatic control is not operating properly.

Thermostatic control is premised on an accurate reading of temperature in the space that is to be maintained at a given setpoint temperature. While considerable advances have been made in the design and manufacture of thermostats and the temperature sensors embodied therein, there is still a possibility that a thermostat's temperature sensor or the circuitry associated therewith may not necessarily function properly. Such a malfunction of the sensor or associated circuitry could result in a complete lack of heating or cooling of the space in which the thermostat has been installed. Should a minimum amount of heating be expected of the space, damage could potentially occur to temperature sensitive items in the space.

OBJECT OF THE INVENTION

It is an object of the invention to provide a thermostat with the ability to function even though the thermostatic temperature sensor for the space or its associated circuitry is not operating improperly.

SUMMARY OF THE INVENTION

The above and other objects of the invention are achieved by providing a thermostat that monitors the temperature being provided by the thermostat's temperature sensor. The monitored temperature must be within a pre-defined range of acceptable temperatures to be considered valid. In the event that the monitored temperature is outside of this pre-defined range, the thermostat proceeds to read the temperature outside the building in which the thermostat has been installed. If the outside temperature reading is below a pre-defined level, the thermostat proceeds to activate a heating system so as to heat the space within the building wherein the thermostat has been installed regardless of the questionable indoor temperature readings.

In a preferred embodiment, the activation of the heating system occurs at predetermined times. The amount of time that the heating system remains activated at these times is computed by the thermostat as a function of the outdoor air temperature.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
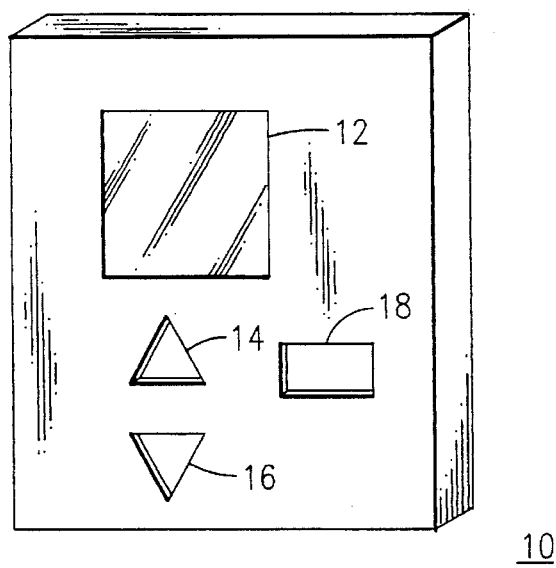
FIG. 1 illustrates a programmable thermostat that includes a microprocessor control therein.

Referring to FIG. 1, a thermostat 10 is seen to include a liquid crystal display 12 as well as an up pressure sensitive switch 14 and a down pressure sensitive switch 16.

The thermostat is operative to display the current setpoint temperature in response to a depression of either the up switch 14 or the down switch 16. The thermostat subsequently changes the displayed setpoint temperature in a direction indicated by continued depression of the particular switch until such time as the switch is no longer depressed. It is also to be understood that the thermostat 10 will display the present mode of operation when the mode selection switch 18 is depressed. The thermostat will moreover display alternative modes of operation if the mode switch continues to be depressed. The release of the mode switch upon the display of any particular mode of operation will result in that particular mode of operation being selected. It is to be appreciated that the above functions of a programmable thermostat are well known in the art.

Figure 2:
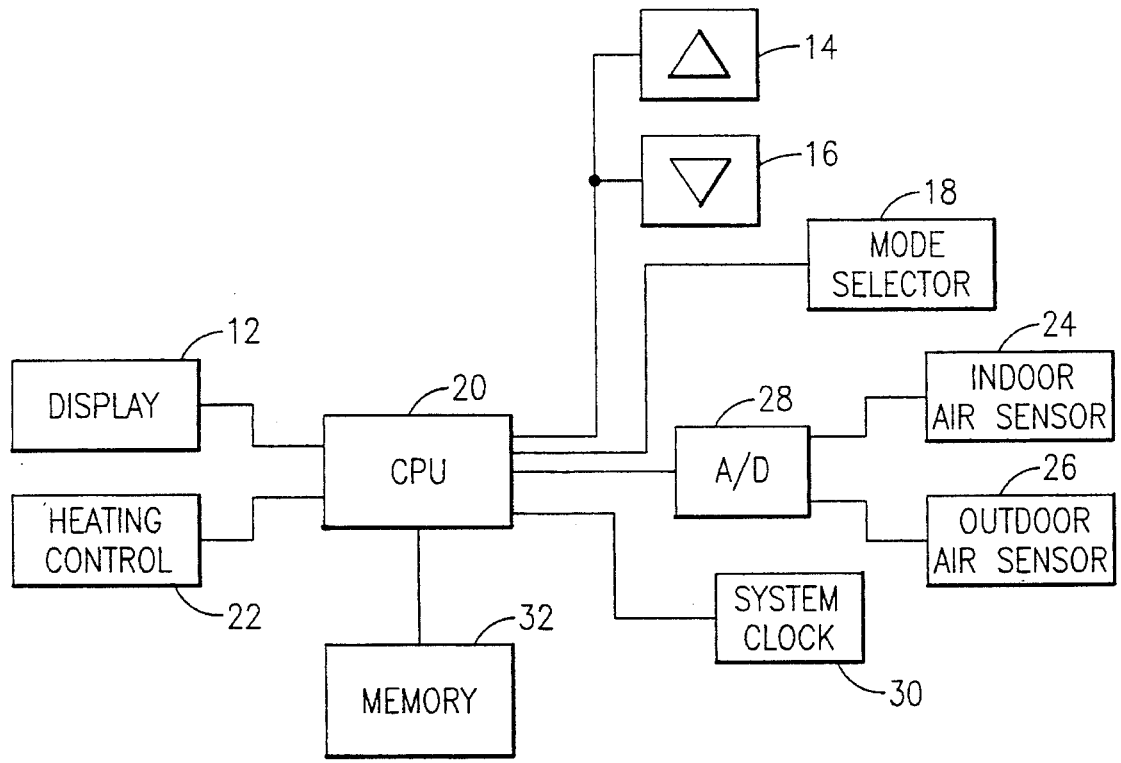
FIG. 2 illustrates the microprocessor control residing within the thermostat of FIG. 1.

Referring to FIG. 2, the display 12, up switch 14, down switch 16, and mode selection switch 18 are illustrated relative to a microprocessor 20. In particular, the display 12 and the switches 14 through 18 are operatively connected to the microprocessor 20. The microprocessor 20 is also operatively connected to a heating control 22. The microprocessor 20 is furthermore connected to an indoor air sensor 24 as well as an outdoor air sensor 26 through an A/D circuit 28. It is to be understood that indoor air sensor 24 is usually integral with the body of the thermostat 10. The thermostat 10 is moreover normally mounted to an interior part of a building so that the indoor air sensor will sense the indoor temperature of that part of the building. It is furthermore to be understood that the outdoor air sensor 26 is normally mounted to the exterior of the building so as to measure the outdoor air temperature adjacent the building. The electrical connection between the thermostat 10 and the outdoor air sensor 26 is via a terminal on the thermostat electrically connected to wiring within the building that is in turn connected to the outdoor air sensor 26. The microprocessor is also connected to a system clock 30, which defines the time of day to the central processor 20. It is to be understood that the microprocessor will initially respond to any variation between the sensed temperature from the indoor air sensor 24 and a particular setpoint temperature. The microprocessor will activate the heating control 22 when the sensed temperature is less than the setpoint temperature. The microprocessor will also execute other tasks as may be required from time to time including, by way of example, the aforementioned programming of particular setpoint temperatures and/or modes of operation. Such normal programmed setpoints and modes of operation will normally dictate the timed operation of the thermostat as defined by the system clock 30. The microprocessor performs these various tasks by executing instructions and responding to programmed setpoints stored in a memory 32.

Figure 3A:
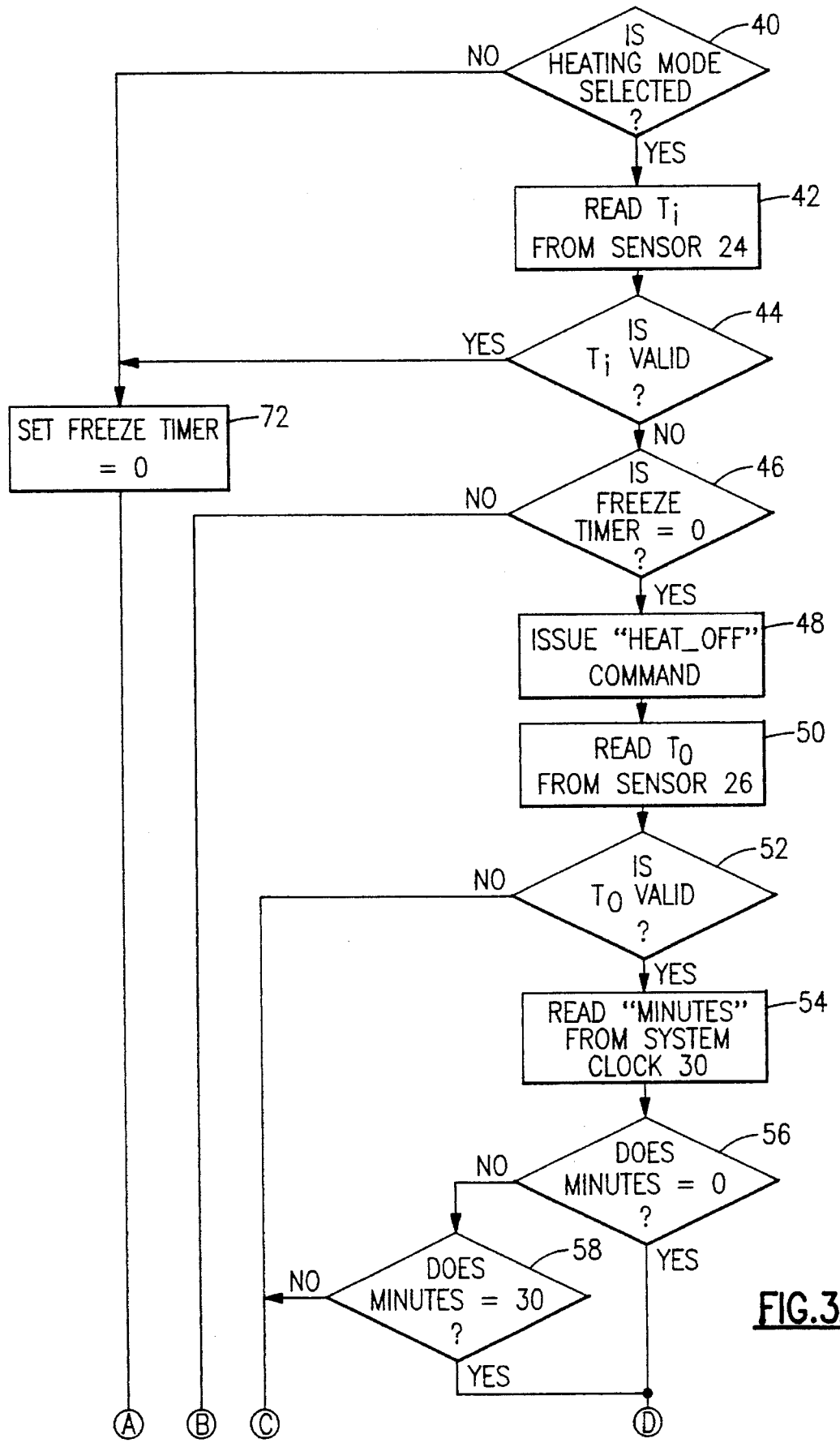
FIGS. 3A and 3B illustrate a control program executable by the microprocessor control system of FIG. 2.
Figure 3B:
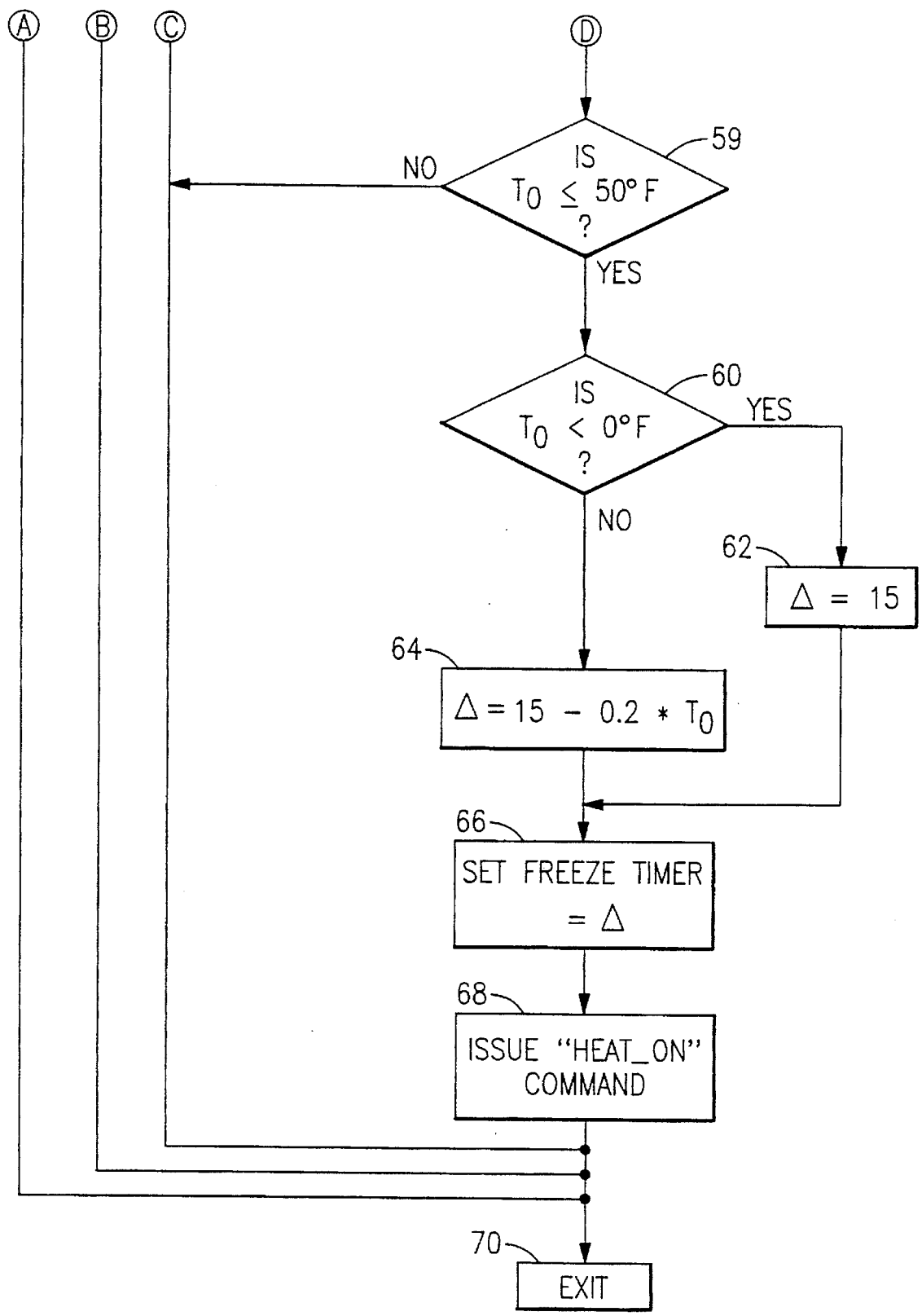

Referring to FIGS. 3A and 3B, a particular process stored in memory 32 and executable by the microprocessor 20 is illustrated in detail. The particular process disclosed in FIGS. 3A and 3B is a freeze protect routine which allows the microprocessor 20 to continue to send control signals to the heat control 22 in the event that the temperature control sensor or the circuitry associated therewith is not operating properly. This process begins with a step 40, wherein an inquiry is made as to whether a heating mode has been selected. As has been previously discussed, the microprocessor will have stored in memory 32 a particular mode of operation that has been selected or programmed during the display of modes of operation upon depression of the mode selection switch 18. To the extent that such a mode has been selected, inquiry is made in step 40 as to whether it is a heating mode. In the event that a heating mode has been selected, the microprocessor will proceed to a step 42 and read the indoor temperature $T_i$ from the indoor air sensor 24. The microprocessor proceeds to a step 44 and inquires as to whether the indoor temperature, $T_i$, is valid. This inquiry is preferably a comparison of $T_i$ with a range of permitted temperatures for the indoor air sensor 24. This range of temperatures can be arbitrarily defined and stored in the memory 32 or the range of temperatures can be established based on a recorded history of temperature variations of the indoor air sensor over a significant period of time, such as a complete calendar year wherein all normal indoor air temperature conditions will have been duly noted in defining the range of permissible temperatures throughout the year. It is hence to be appreciated that almost any range of temperatures that would encompass the likely highest and lowest temperatures to be encountered by the sensor 24 would be sufficient as the predefined range of temperatures used in implementing step 44. The predefined range could also be expanded to a range of temperatures that would simply never be encountered in any realistic indoor temperature reading. Referring again to step 44, in the event that the read indoor air temperature is not within the pre-defined range of permissible temperatures, the microprocessor will proceed along a no path out of step 44 to a step 46 and inquire as to whether the time indicated by a freeze timer is equal to zero. The freeze timer will have been initially set equal to zero when the microprocessor is first powered up. This will prompt the microprocessor to proceed from step 46 to a step 48 and issue a HEAT_OFF command to the heat control 22. The microprocessor next proceeds in a step 50 to read the outdoor temperature $T_o$ from the outdoor air sensor 26. The microprocessor proceeds in a step 52 to inquire as to whether the thus read $T_o$ is valid. This is preferably a reading of a predetermined range of temperatures that is either historically or arbitrarily defined for the outdoor air sensor 26 in much the same manner as has been previously discussed for establishing the allowable range of indoor air temperatures. In the event that the outdoor temperature reading is within the predetermined range of outdoor temperatures, the microprocessor proceeds to a step 54 and reads the minutes portion of the time of day indicated by the system clock 30. The microprocessor proceeds in a step 56 to inquire as to whether the minutes portion of the system clock time equals zero. This will occur each time the system clock moves to another hour of the day. If the answer is no, the microprocessor will proceed in a step 58 to inquire as to whether the minutes read from the system clock 30 equal thirty. This will of course occur every one-half hour after the hour. In the event that it is either the hour or one-half hour after the hour, the microprocessor will proceed from either step 56 or step 58 to a step 59 and inquire as to whether the read temperature $T_o$ from sensor 26 in step 50 is less than or equal to fifty degrees Fahrenheit. If the answer is yes, the microprocessor will proceed to a step 60 and inquire as to whether the read temperature $T_o$ from sensor 26 in step 50 is less than zero degrees Fahrenheit. In the event that the outdoor temperature reading is below zero degrees Fahrenheit, the microprocessor will set the time period, Δ, equal to a fixed period of time of fifteen minutes as indicated in a step 62. It is to be noted that the fixed period is preferably one-half of the thirty minute time intervals occuring between the hour and half hour system clock times stipulated in steps 56 and 58. As will be apparent hereinafter, the relationship between clock time intervals and the fixed period of time established for Δ will define the heating cycle for a heating system associated with heating control 22 when the outdoor temperature is below zero degrees Fahrenheit. Referring again to step 60, in the event that the outdoor temperature reading, $T_o$, is equal to or greater than zero degrees Fahrenheit, the microprocessor will proceed to a step 64 and calculate the time period, Δ. The actual calculation consists of subtracting two-tenths of the read outdoor temperature, $T_o$, from the fixed time period of fifteen minutes. Regardless of whether step 62 or 64 is encountered, a time period Δ is established before the microprocessor proceeds in a step 66 to set the freeze timer equal to the time period, Δ. The freeze timer is preferably a separate software routine that will immediately begin decrementing the time that has been provided to it in step 66. This routine will continue to execute independent of any other routine being executed by the microprocessor including the process of FIGS. 3A and 3B. In this manner, the freeze timer will always indicate the time remaining before the time period, Δ, is decremented to zero. The microprocessor proceeds to issue a "HEAT_ON" command to the heating control 22 in a step 68 before exiting the process of FIGS. 3A and 3B in a step 70. It is to be appreciated that the microprocessor will execute various other routines stored in memory 32 before returning to the particular process routine described in FIGS. 3A and 3B. The execution of the other tasks will normally take less than one second so as to thereby assure that the system clock 30 has not advanced in its numerical count of minutes before another reading occurs in step 54.

Referring to FIG. 3A, the microprocessor will again execute step 40 and inquire as to whether the heating mode remains selected. In the event that the heating mode remains selected, the microprocessor proceeds in a step 42 to again read the indoor temperature $T_i$, from the indoor air sensor 24. If the indoor temperature continues to remain invalid, the microprocessor will proceed along the no path out of step 44 to step 46 and inquire as to whether the freeze timer is equal to zero. Since the freeze timer has been recently set equal to the time period, Δ, in step 66, the freeze timer is most likely still decrementing toward zero. The microprocessor will hence proceed along the no path from step 46 and exit the process of FIGS. 3A and 3B in step 70.

As has been previously described, the microprocessor will return to step 40 in less than a second. The microprocessor will again read the indoor temperature $T_i$ from the sensor 24 and if this temperature reading remains invalid, the microprocessor will proceed to again inquire as to whether the freeze timer equals zero. It is to be appreciated that at some point, the freeze timer will have decremented to zero. When this occurs, the microprocessor will proceed along the yes path out of step 46 and issue a HEAT_OFF command. Assuming that the outdoor air sensor continues to function properly, the microprocessor will proceed to inquire as to whether the system clock indicates the tolling of an hour or half hour in steps 56 and 58. Since the freeze timer has recently expired, the system clock 30 will not be indicating such times. This will prompt the microprocessor to proceed along the no paths out of steps 56 and 58, respectively, and exit the process in step 70.

The microprocessor will continue to timely execute the process of FIGS. 3A and 3B and issue the HEAT_ON command to the heat control for the time period, Δ, when the system clock reaches either the hour or the half hour time. This will occur as long as the indoor air temperature sensor 24 or the circuitry associated therewith fails to provide a valid temperature to the microprocessor, and the outdoor temperature $T_o$ is equal to or less than fifty degrees Fahrenheit. The HEAT_ON command will be active for fifteen minutes when $T_o$ is less than zero degrees Fahrenheit. This will result in heating being authorized for a maximum of one-half of each thirty minute time interval that elapses between successive system clock activating times.

It is to be appreciated that any time the indoor air temperature reading becomes valid again, the microprocessor will proceed from step 44 to step 72 and set the timer period, Δ, equal to zero. The process of FIGS. 3A and 3B will thereafter continue to execute in this particular manner as long as the indoor temperature reading remains valid.

It is to be appreciated that a particular embodiment of the invention has been described. Alterations, modifications and improvements will readily occur to those skilled in the art. For example, the fixed time period of fifteen minutes set forth in step 62 may be altered or modified as long as the resulting fixed period is adequate to maintain an indoor temperature above freezing for a particular building experiencing a below zero outdoor temperature condition. The time intervals between successive system clock activating times would also be preferably modified so as to be twice the particular fixed period of time. This would mean that the heat would be on for a maximum of one-half of any time interval between successive clock activating times. Accordingly, the foregoing description is by way of example only and the invention is to be limited only by the following claims and equivalents thereto.

What is claimed is:

1. A thermostat for controlling the activation of a heating unit in response to questionable indoor temperature readings, said thermostat comprising:

an indoor temperature sensor;

an outdoor temperature sensor;

a heating control for activating a heating apparatus; and a processor interfacing with said indoor temperature sensor, said outdoor temperature sensor, and said heating control, said processor being operative to read the indoor temperature from said indoor temperature sensor and to compare the read indoor temperature with an acceptable range of indoor temperature values, said processor being furthermore operative to read the outdoor temperature from the outdoor temperature sensor when the indoor temperature reading is not within the acceptable range of indoor temperature values, said processor being furthermore operative to transmit a signal activating said heating control when the outdoor temperature reading is below a predefined value of outdoor temperature.

2. The thermostat of claim 1 wherein said processor is furthermore operative to compute a period of time during which the signal activating said heating control must be on wherein the computed period of time is a function of the read outdoor temperature.

3. The thermostat of claim 2 wherein the period of time during which the signal activating said heating control must be on is computed by said processor setting the period of time equal to a fixed period of time when the outdoor temperature is less than or equal to a second predefined value of outdoor temperature and wherein said processor is operative to set the period of time equal to the fixed period of time minus a predetermined amount of the difference between outdoor temperature and the second predefined value of outdoor temperature when the outdoor temperature is greater than the second predefined value of outdoor temperature.

4. The thermostat of claim 3 wherein said processor is operative to begin transmitting the signal activating said heating control only at predetermined times.

5. The thermostat of claim 4 wherein the predetermined times occur at predefined intervals of time and wherein each predefined interval of time is a constant multiple of the fixed period of time.

6. The thermostat of claim 5 wherein the constant multiple is two.

7. The thermostat of claim 1 wherein said processor is operative to begin transmitting the signal activating said heating control only at predetermined times.

8. A process, executable by a processor within a programmable thermostat, for controlling the activation of a heating control associated with heating apparatus when the indoor temperature sensor for sensing the temperature of a space within a building to be heated by the heating apparatus or the circuitry between the indoor temperature sensor and the processor is not providing a valid temperature reading to the processor, said process comprising the steps of:

reading the indoor temperature of the space provided by the indoor temperature sensor through the circuitry between the indoor temperature sensor and the processor;

comparing the read indoor temperature of the space with a predefined range of allowable indoor temperatures;

reading the temperature of the outdoor air provided by an outdoor air temperature sensor exposed to the outdoor air immediate to the building having the space that is to be heated; and activating the heating control when the indoor temperature is not within the predefined range of allowable indoor temperatures and the outdoor temperature reading is below a predefined threshold value of outdoor temperature.

9. The process of claim 8 wherein said step of activating the heating control when the indoor temperature is not within the predefined range of allowable indoor temperatures and the outdoor temperature is below a predefined threshold value comprises the steps of:

computing a period of time during which the signal activating the heating control must be on, the computed period of time being a function of the read outdoor temperature; and activating the heating control for the computed period of time.

10. The process of claim 9 wherein said step computing the period of time during which the signal activating the heating control must be on comprises the steps of:

setting the period of time equal to a fixed period of time when the outdoor temperature is less than a second predefined outdoor temperature value; and setting the period of time equal to the fixed period of time minus a predetermined amount of the difference between the read outdoor temperature and the second predefined outdoor temperature value when the outdoor temperature is greater than the second predefined outdoor temperature value.

11. The process of claim 10 wherein said step of activating the heating control when the indoor temperature is not within the predefined range of allowable indoor temperatures and the outdoor temperature is below a predefined value further comprises the step of:

monitoring a clock time provided to the processor; and activating the heating control only at predefined intervals of the clock time.

12. The process of claim 11 wherein the predefined intervals of the clock time are each a constant multiple of the fixed period of time.

13. The process of claim 12 wherein the constant multiple is two.

14. The process of claim 8 wherein said step of activating the heating control when the indoor temperature is not within the predefined range of allowable indoor temperatures and the outdoor temperature is below a predefined value further comprises the step of:

monitoring a clock time provided to the processor; and activating the heating control only at predetermined clock times provided to the processor.

* * * * *